(Specimens.)

F. S. SHIRLEY & A. STEFFIN.
LAMP SHADE AND BOWL.

No. 345,182.　　　　　　　　　　Patented July 6, 1886.

Witnesses:
Chas. F. Swift
T. J. Cauty

Inventor:
Fredk S. Shirley
Albert Steffin

UNITED STATES PATENT OFFICE.

FREDERICK S. SHIRLEY AND ALBERT STEFFIN, OF NEW BEDFORD, MASSACHUSETTS; SAID STEFFIN ASSIGNOR TO THE MOUNT WASHINGTON GLASS COMPANY, OF SAME PLACE.

LAMP SHADE AND BOWL.

SPECIFICATION forming part of Letters Patent No. 345,182, dated July 6, 1886.

Application filed April 8, 1886. Serial No. 198,230. (Specimens.)

*To all whom it may concern:*

Be it known that we, FREDERICK S. SHIRLEY and ALBERT STEFFIN, citizens of the United States, residing at New Bedford, in the county of Bristol and State of Massachusetts, have invented certain new and useful Improvements in Decorated Lamp Shades, Bowls, &c., having ribbed surfaces, of which the following is a specification, reference being had to the accompanying drawings.

Our invention relates to an improvement in ornamental glass shades and bowls for lamps, &c.; and it consists, first, in the methods or processes of decorating, by which we obtain more perfect results and an increased scope of ornamentation; second, in the new article of manufacture produced, as more fully described hereinafter, and shown in the accompanying drawings.

Figure 1:
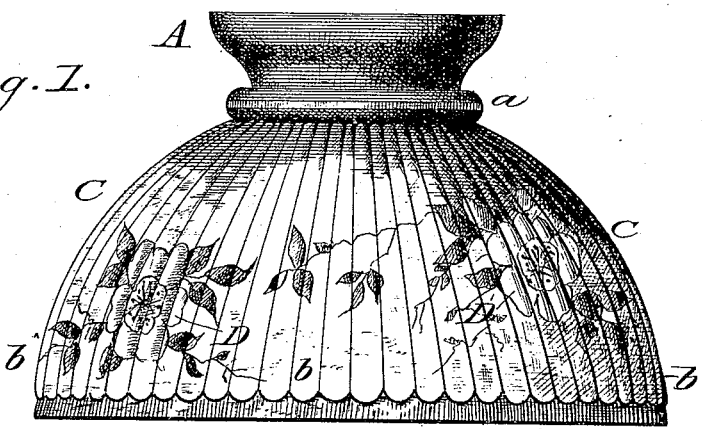
Figure 2:
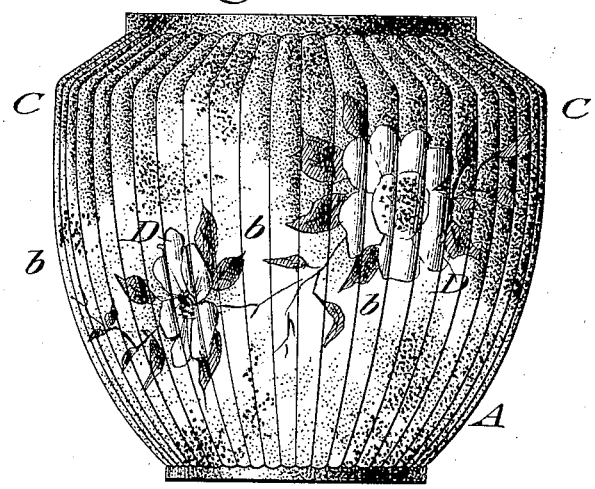
Figure 3:
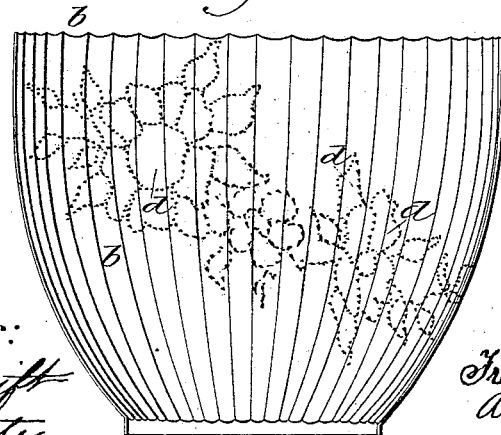

Figure 1 is a side elevation of an ornamented glass shade as produced by our invention. Fig. 2 shows a ribbed bowl or shell which can be used as a globe or shade, or arranged as a receiver for an oil fount or reservoir. Fig. 3 shows a ribbed stencil-plate having ribs b' b' b' and the floral design d d d punctured therein.

Similar letters refer to similar parts in each view.

A is the body, formed of a series of convex ribs, b b, of any desired width, and tapering from the largest diameter of the body A to the neck a. These ribs are divided by sharp line indentations.

C C illustrate one decoration as produced by our process on these articles.

D D illustrate a floral or connected ornamentation.

d d in Fig. 3 shows the perforated corrugated stencil for producing such designs.

Shades of above form, and having ribbed surfaces, have heretofore been made of opal white glass, or of one color throughout, or when a colored ribbed shade was desired in combination with a white interior reflecting-surface they have been made of two or more glasses cased over each other during the formation of article. This not only limited the ornamental effects that could be produced, but also rendered them of high cost, as well as susceptible to fracture from unequal expansion of the glasses when subjected to the different range of temperature they are exposed to in use.

In practising our invention we take a shade or bowl having the convex ribbed surface, the body being formed preferably of white opal glass, though other colored glass or plain glass may be used, if desired. We proceed to color this by coating same with suitable vitrifiable colors properly fluxed, so that by firing in suitable kilns the coloring will become part of the article; but neither these colors or the firing form any part of our invention. When these colors are mixed, instead of covering the whole shade as usually practiced in the art, we proceed as follows: We take the color of the desired tint, and with a fine brush first color-paint all the indented lines only, the color being mixed of sufficient consistency to prevent running. The color thus applied will slightly cover the rise of each rib at side of line. The article is then allowed to dry. When dry we proceed to complete the first coat of color (which, if desired, may be the only ornamentation applied) by painting in each rib, being careful to meet and join in to line first painted. The dried line will be found to absorb any surplus moisture of coloring-coat last applied, and prevents the color running and being gathered into the indented lines, as must be the case when the article is painted all over at once. By this method we secure perfect work and a smooth and uniform coating of the desired color or colors, which may be sufficient decoration, or may serve as a ground or base for further ornamentation in continuation of our process. We then proceed to apply a new style of decoration to these shades, for which we find the ribbed surface specially adapted. We mix the desired color or colors of sufficient thinness to enable them to be ejected from an atomizer, governing the size of sprayed spots by the size of the delivery-tube. By this means the irregular or ribbed surface can be reached where desired, one coat can be allowed to dry, and other applications made of colors over same, and gold composition can be applied in like manner and produce the effect of goldstone, and many other artistic effects never before produced. This irregular effect is shown in drawings at C C C. Like effects can be produced by applying coats of colorless flux, and dusting on the dry color while flux is still wet. By this means the different coats or colors can be applied in succession without waiting for each to dry. We also obtain an irregularly-connected mottled effect by using pieces of sponge of different textures, so trimmed as to fit the lines. We use these as types or printing-stamps with which to apply the color, and by this means produce many tasty effects.

In applying floral or other connected ornamental patterns, it will be found necessary to distort or widen the regular forms of designs desired to be shown when completed, so as to allow for the additional surface contained in the ribs $b\ b\ b$, which have to be covered to perfect the design in its appearance to the eye from the different points of sight, as the dip of the ribs $b\ b\ b$ foreshorten the outline so that it requires skill and artistic taste to produce perfect and satisfactory work; and in order to produce such patterns in a cheap manner, we form a corrugated stencil, as shown in Fig. 3, by taking paper suitable for such purpose, and damp it and take a sectional impression of the surface of the article. We do this by forming a cast or mold of plaster from surface, and after varnishing same to prevent paper from adhering we compress the damp paper between the mold and surface of article till dry, when it will be found to keep its form. The desired design is then traced out in correct size and form on the upper face only of the ribs $b'\ b'\ b$, so as to insure the correct appearance desired, and the continuation of the outlines are then completed, and the whole design punctured with a continuous line of suitable sized holes. This stencil is then applied to surface of the article, and brushed or dusted over with charcoal dust or its equivalent, and the pattern so transferred to the article when ordinary labor can fill in the color, and complete and duplicate the goods at comparatively small cost, and most artistic and effective results obtained. These corrugated stencils can be readily produced at small cost, and being made in section can be applied to the various parts of the article, and, if desired, the designs connected by the lines being connected to each other. After the work is completed as to decoration, we fix the colors by firing them in suitable kilns in the manner known to the art.

Having described our invention, what we claim, and desire to secure by Letters Patent, is—

1. As a new article of manufacture, a glass lamp shade or bowl having a convex ribbed surface, and ornamented or decorated with vitrified colors fused to its surface, substantially as described.

2. As a new article of manufacture, a glass lamp shade or bowl with a convex ribbed surface decorated in vitrified colors with a splashed or mottled design, substantially as shown and described.

3. As a new article of manufacture, a glass lamp shade or bowl formed with a convex ribbed surface, in combination with a floral or similar decoration in vitrified colors, substantially as shown and described.

In testimony whereof we affix our signatures in presence of two witnesses.

FREDK. S. SHIRLEY.
ALBERT STEFFIN.

Witnesses:
R. G. TOBEY,
CHAS. F. SWIFT.